United States Patent
Vadnere et al.

(10) Patent No.: US 12,184,211 B2
(45) Date of Patent: Dec. 31, 2024

(54) END TRAVEL LIMIT CALIBRATION OF AN ELECTRIC ACTUATOR

(71) Applicant: DEERE & COMPANY, Moline, IL (US)

(72) Inventors: Mohan A. Vadnere, Pune (IN); Mitchell R. Usasz, Ottumwa, IA (US); Paloma Karst, Red Wing, MN (US)

(73) Assignee: Deere & Company, Moline, IL (US)

( * ) Notice: Subject to any disclaimer, the term of this patent is extended or adjusted under 35 U.S.C. 154(b) by 746 days.

(21) Appl. No.: 17/444,838

(22) Filed: Aug. 11, 2021

(65) Prior Publication Data

US 2023/0048708 A1 Feb. 16, 2023

(51) Int. Cl.
| | |
|---|---|
| *H02P 25/06* | (2016.01) |
| *A01D 43/06* | (2006.01) |
| *A01D 69/02* | (2006.01) |
| *A01D 75/18* | (2006.01) |

(52) U.S. Cl.
CPC .............. *H02P 25/06* (2013.01); *A01D 43/06* (2013.01); *A01D 69/02* (2013.01); *A01D 75/182* (2013.01)

(58) Field of Classification Search
CPC ......... H02P 25/06; A01D 43/06; A01D 69/02; A01D 75/182
See application file for complete search history.

(56) References Cited

U.S. PATENT DOCUMENTS

| | | |
|---|---|---|
| 5,704,200 A | 1/1998 | Chmielewski, Jr. et al. |
| 2018/0325032 A1 | 11/2018 | Rotole et al. |
| 2020/0077585 A1 | 3/2020 | Garbald et al. |
| 2021/0000006 A1* | 1/2021 | Ellaboudy ............ A01B 69/008 |
| 2021/0195827 A1* | 7/2021 | Zhou .................... A01B 79/005 |
| 2021/0289703 A1* | 9/2021 | Hunt .................... A01D 41/141 |
| 2022/0015288 A1* | 1/2022 | Christiansen ........... G01S 13/42 |

OTHER PUBLICATIONS

Extended European Search Report and Written Opinion issued in European Patent Application No. 22185671.9, dated Mar. 13, 2023, in 06 pages.

* cited by examiner

*Primary Examiner* — Zoheb S Imtiaz

(57) ABSTRACT

A method of defining an end travel limit of an electric actuator includes sensing an electric current of the electric actuator while moving the electric actuator from a first position to a second position. A maximum travel current of the electric current sensed during movement of the electric actuator between the first position to the second position is increased by a factor to define a maximum calibration current. The electric current is then sensed while moving from the second position toward an end travel position of the electric actuator. Movement of the electric actuator is stopped at a fault position when the electric current equals the maximum calibration current. The end travel limit of the electric actuator is then defined as a function of the fault position.

19 Claims, 4 Drawing Sheets

END TRAVEL LIMIT CALIBRATION OF AN ELECTRIC ACTUATOR

TECHNICAL FIELD

The disclosure generally relates to a method and system for calibrating an end travel limit of an electric actuator used to move a crop engaging component of a crop harvesting implement.

BACKGROUND

Crop harvesting implements may include one or more crop engaging components that are moveable between different operating positions. In some implementations, the crop engaging component is moved between its various positions by an electric actuator. The crop engaging component exhibits an allowable range of motion. Movement beyond the allowable range of motion may damage the crop engaging component. The electric actuator is capable of moving through a full range of motion defined between an absolute begin travel position and an absolute end travel position. However, due to sizing, availability, cost, etc., the full range of motion of the electric actuator, between the absolute begin travel position and the absolute end travel position, may exceed the allowable range of motion of the crop engaging component. In other words, the crop engaging component may include a range of motion that is less than the full range of motion provided by the electric actuator. In these situations, in order to prevent damage to the crop engaging component, an end travel limit for the electric actuator is defined. The electric actuator is controlled so that it does not move past or beyond the end travel limit, thereby preventing damage to the crop engaging component.

In order to set or calibrate the end travel limit for the electric actuator, it is known to define a current calibration level, and move the electric actuator until the measured electric current of the electric actuator reaches the current calibration level, at which time the electric actuator is stopped and that position of the electric actuator is defined as the end travel limit. However, because the resistance between different components varies between different machines, wear on the components varies between different machines and on the same machine over time, wear of the electric actuator varies with time and between machines, etc., the standardized current calibration level may not accurately set or define the end travel limit for the electric actuator.

SUMMARY

A method of defining an end travel limit of an electric actuator is provided. The electric actuator is moveable between a begin travel position and an end travel position. The method includes moving the electric actuator from a first position to a second position. An electric current of the electric actuator is sensed while moving the electric actuator from the first position to the second position. A maximum value of the electric current sensed during movement of the electric actuator between the first position to the second position is defined as a maximum travel current. The maximum travel current is increased by a factor to define a maximum calibration current. The electric actuator is then moved from the second position toward the end travel position of the electric actuator. The electric current of the electric actuator is sensed while moving the electric actuator from the second position toward the end travel position. Movement of the electric actuator from the second position toward the end travel position is stopped at a fault position when the electric current sensed during movement of the electric actuator from the second position toward the end travel position equals the maximum calibration current. The end travel limit of the electric actuator is then defined as a function of the fault position.

In one aspect of the disclosure, the end travel limit of the electric actuator may be defined to equal a position that is disposed a pre-defined offset distance nearer the begin travel limit than the fault position. The pre-defined offset distance may be defined for each different application. By so doing, during normal operation, the electric actuator moves to and stops short of the fault position i.e., at the pre-defined offset distance prior to reaching the fault position.

In one aspect of the disclosure, the electric actuator exhibits a normal operating speed. The step of moving the electric actuator from the first position to the second position may include moving the electric actuator at a calibration speed. The calibration speed may be defined to be less than the normal operating speed. Additionally, in one aspect of the disclosure, the step of moving the electric actuator from the second position toward the end travel position may include moving the electric actuator at the calibration speed. In one implementation, the calibration speed may be less than 50% of the normal operating speed. In another implementation, the calibration speed may be less than 25% of the normal operating speed. In one embodiment, the calibration speed may be defined to equal 20% of the normal operating speed of the electric actuator.

In one aspect of the disclosure, the maximum travel current may be increased by a factor of at least 25% of the maximum travel current to define the maximum calibration current. In one implementation, the maximum travel current may be increased by a factor of at least 40% of the maximum travel current to define the maximum calibration current. In other embodiments, the factor may be defined in a manner other than as a percentage of the maximum travel current.

In one aspect of the disclosure, the begin travel position represents a first absolute end of the range of motion of the electric actuator, and the end travel position represents a second absolute end of the range of motion of the electric actuator. The full possible range of motion of the electric actuator may be defined by the movement between the begin travel position and the end travel position. The first position is located nearer the begin travel position than is the second position. The second position is located nearer the end travel position than is the first position. In one aspect of the disclosure, the process includes positioning the electric actuator in the first position prior to moving the electric actuator from the first position to the second position. The first position may be defined to provide a standardized start position for the calibration process described herein.

In one implementation of the disclosure, the electric actuator may include a linear actuator that is operable to extend and retract along a linear path in response to a control signal. The electric current used by the electric actuator is related to a resistance against movement, e.g., extension or retraction, of the electric actuator. In another implementation of the disclosure, the electric actuator may include a rotary actuator that is operable to provide a rotational output or torque in response to a control signal. The electric current used to by the electric actuator is related to a resistance against movement, e.g., rotation, of the electric actuator.

In one aspect of the disclosure, a controller is configured to receive a start calibration command from an operator with a user input. The user input may include, but is not limited to, a touchscreen display, a button, switch, etc. Upon receiving the start calibration command, the process described herein may be implemented by the controller.

In one aspect of the disclosure, in response to receiving the start calibration command and prior to moving the electric actuator from the first position to the second position, the controller may determine if a safety interlock status is satisfied. When the safety interlock status is satisfied, the controller may continue with the calibration process described herein. If the safety interlock statis is not satisfied, then the controller may abort the calibration process. The safety interlock status may include, but is not limited to, the status, condition, or position of a safety device or other component of the system.

In one aspect of the disclosure, the controller may determine if the fault position is identical to the second position, or if the fault position is not identical to the second position. If the controller determines that the fault position is not identical to the second position, then the controller may proceed with the calibration process described herein. If the controller determines that the fault position is identical to the second position, i.e., the electric actuator did not move from the second position prior to the electric current increasing to the maximum calibration current, then the controller may abort the calibration process.

A crop harvesting implement is also provided. The crop harvesting implement includes a housing and a crop engaging component rotatably mounted to the housing. An electric actuator interconnects the housing and the crop engaging component. The electric actuator is moveable between a begin travel position and an end travel position. A current sensor is coupled to the electric actuator. The current sensor is operable to sense data related to an electric current of the electric actuator. A controller is disposed in communication with the electric actuator and the current sensor. The controller is operable to receive the data from the current sensor and control movement of the electric actuator. The controller includes a processor and a memory having an end travel limit calibration algorithm stored thereon. The processor is operable to execute the end travel limit calibration algorithm to position the electric actuator in a first position, and then move the electric actuator from the first position to a second position. Data related to the electric current of the electric actuator is sensed with the current sensor and communicated to the controller while moving the electric actuator from the first position to the second position. The controller defines a maximum value of the electric current sensed during movement of the electric actuator, between the first position to the second position, as a maximum travel current. The controller then increases the maximum travel current by a factor to define a maximum calibration current. The controller then moves the electric actuator from the second position toward the end travel position of the electric actuator. Data related to the electric current of the electric actuator is sensed by the current sensor and communicated to the controller while moving the electric actuator from the second position toward the end travel position. The controller stops movement of the electric actuator from the second position toward the end travel position at a fault position when the data related to the electric current sensed during movement of the electric actuator from the second position toward the end travel position indicates the electric current of the electric actuator is equal to the maximum calibration current. The controller then defines an end travel limit of the electric actuator as a function of the fault position. During normal operation of the electric actuator, the controller stops movement of the electric actuator at the end travel limit prior to reaching the end travel position of the electric actuator.

In one aspect of the disclosure, the processor is operable to execute the end travel limit calibration algorithm to move the electric actuator between the first position and the second position, and from the second position to the fault position, at a calibration speed. In one implementation, the calibration speed may be defined to be at least fifty percent of a normal operating speed of the electric actuator.

In one implementation of the disclosure, the electric actuator may include a linear actuator operable to extend and retract in response to a control signal from the controller. In another implementation of the disclosure, the electric actuator may include a rotary actuator operable to provide a rotational output in response to a control signal from the controller.

In one aspect if the disclosure, the controller may save the end travel limit in the memory of the controller for use during normal operation of the electric actuator.

In one aspect of the disclosure, the processor may be operable to execute the end travel limit calibration algorithm to define the end travel limit to equal a position disposed a pre-defined offset distance from the fault position in a direction nearer the begin travel limit.

In one implementation of the disclosure, the crop engaging component is a forming shield of a mower implement, and the electric actuator is a linear actuator operable to move the forming shield relative to the housing.

Accordingly, the system and process described herein enable more accurate and timely determination of the end travel limit, thereby preventing damage to the crop engaging component and/or the housing of the crop harvesting implement. The system and process described herein are not dependent or affected by the variability between different machines, as well as the variability and deviation from original condition due to age, rust, and/or wear.

The above features and advantages and other features and advantages of the present teachings are readily apparent from the following detailed description of the best modes for carrying out the teachings when taken in connection with the accompanying drawings.

DETAILED DESCRIPTION

Figure 1:
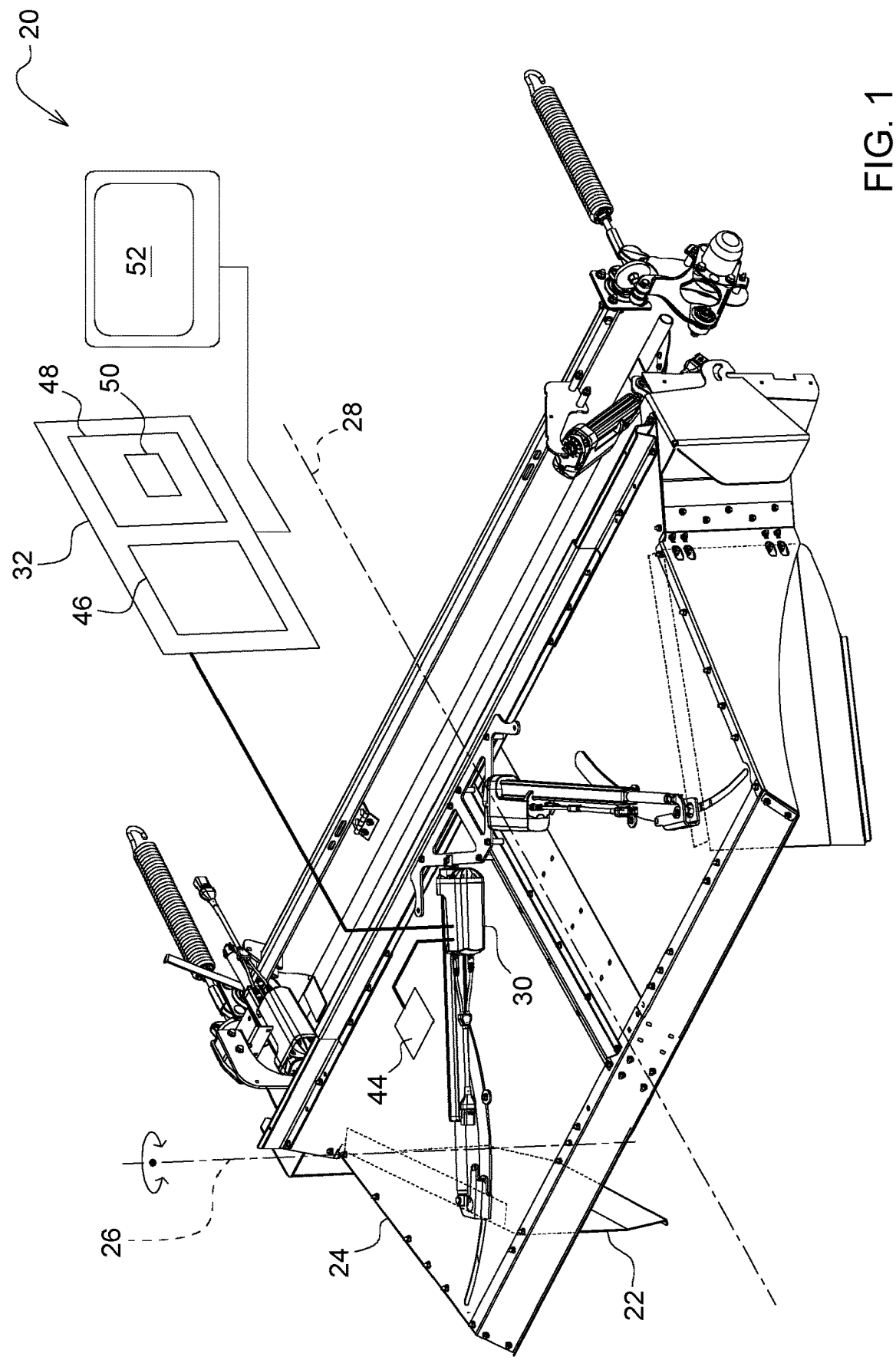
FIG. 1 is a schematic perspective view of a crop harvesting implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a crop harvesting implement is generally shown at 20. The crop harvesting implement 20 shown in the Figures and described herein is configured as a crop mower for cutting crop material and forming the cut crop material into a windrow. However, it should be appreciated that the crop harvesting implement 20 may be configured differently than the example implementation shown in the Figures and described herein.

The crop harvesting implement 20 includes a crop engaging component 22. In the example implementation of the crop harvesting implement 20, the crop engaging component 22 is configured as a forming shield of the mower implement. The crop shield is positionable to adjust the shape and width of the windrow. It should be appreciated that crop engaging component 22 may differ from the example implementation shown in the Figures and described herein. Additionally, it should be appreciated that different implementations of the crop harvesting implement 20 may include multiple and/or different implementations of the crop engaging component 22.

The crop harvesting implement 20 includes a frame or housing 24, which supports various components. The housing 24 may include, but is not limited to, various support structures, panels, wall members, braces, etc. In the example implementation shown in the Figures and described, the housing 24 may include, but is not limited to, one or more panels forming a rigid structure.

The crop engaging component 22 is moveable relative to the housing 24. In the example implementation, the crop engaging component 22 i.e., the forming shield, is rotatably mounted to the housing 24 for rotational movement about a shield rotation axis 26 relative to the housing 24. In the example implementation shown in the Figures and described herein, the shield rotation axis 26 is disposed in a generally vertical orientation, with the crop engaging component 22 moveable in a generally horizontal plane toward and away from a central longitudinal axis 28 of the crop harvesting implement 20. The central longitudinal axis 28 extends in a direction parallel with a travel direction of the crop harvesting implement 20 during operation of the crop harvesting implement 20.

Figure 3:
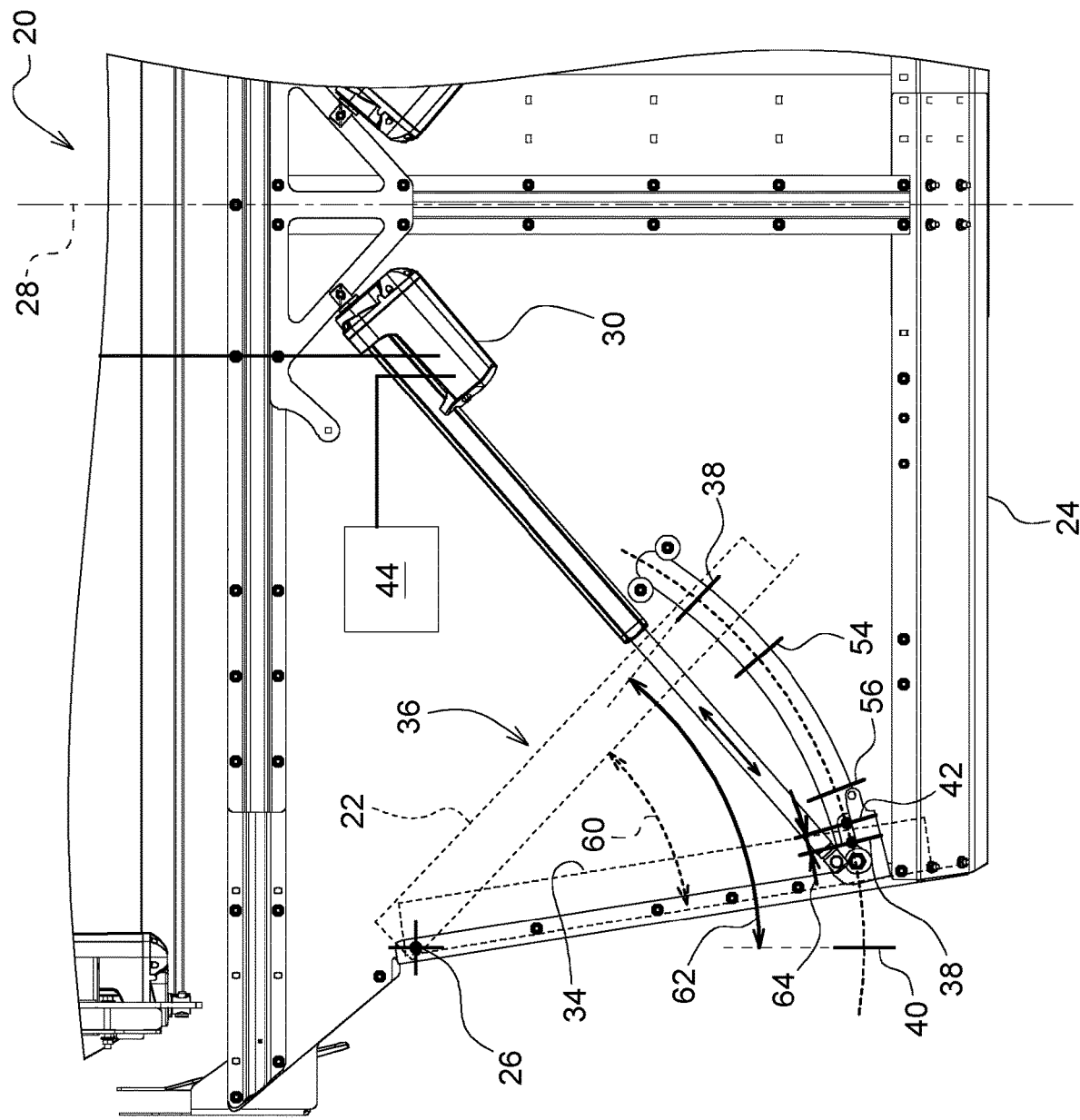
FIG. 3 is a schematic partial plan view of the crop harvesting implement indicating various positions of a crop engaging component and an associated electric actuator.

Referring to FIG. 3, the crop engaging component 22, e.g., the forming shield of the example implementation, is rotatably moveable relative to the housing 24 through a range of motion 60 between an inboard position 36, and an outboard position 34. As used herein, the term "inboard position 36" is understood to refer to a position nearer the central longitudinal axis 28, whereas the term "outboard position 34" is understood to refer to a position farther from the central longitudinal axis 28. The physical construction of the crop engaging component 22 and the housing 24 prevent unobstructed movement of the crop engagement component beyond the range of motion 60 permitted between the inboard position 36 and the outboard position 34.

An electric actuator 30 interconnects the housing 24 and the crop engaging component 22. Referring to FIG. 3, the electric actuator 30 is moveable through a range of travel 62 between a begin travel position 38 and an end travel position 40. As used herein, the term "begin travel position 38" includes a fully retracted position or a fully wound position, whereas the term "end travel position 40" includes a fully extended position, or a fully unwound position. In the example implementation shown in the Figures and described herein, the electric actuator 30 is a linear actuator operable to extend and retract in response to a control signal from a controller 32. As such, the begin travel position 38 is a fully retracted position of the linear actuator and the end travel position 40 is a fully extended position of the linear actuator. The electric actuator 30 moves or extends through the range of travel 62 along the linear path between the begin travel position 38, i.e., the fully retracted position, and the end travel position 40, i.e., the fully extended position.

In other implementations, the electric actuator 30 may include a rotary actuator operable to provide a rotational output in response to the control signal from the controller 32. As such, the begin travel position 38 is a fully wound position of the rotary actuator and the end travel position 40 is a fully unwound position of the rotary actuator. The rotary actuator moves or rotates through the range of travel 62 between the begin travel position 38, i.e., the fully wound position, and the end travel position 40, i.e., the fully unwound position. It should be appreciated that the electric actuator 30 may differ from the example embodiments described herein, i.e., the linear actuator and the rotary actuator, and that the begin travel position 38 and the end travel position 40 may be defined differently than the examples provided herein.

In some implementations, the range of travel 62 of the electric actuator 30 is greater than the range of motion 60 of the crop engaging component 22. In other words, the end travel position 40 of the electric actuator 30 may be positioned farther outboard than the outboard position 34 of the crop engaging component 22. Should the electric actuator 30 move to the full end travel position 40, i.e., beyond the outboard position 34 of the crop engaging component 22, damage to the electric actuator 30 and/or the crop engaging component 22 may occur. Therefore, in order to prevent damage to the electric actuator 30 and/or the crop engaging component 22, an end travel limit 42 for the electric actuator 30 may be defined and set in the controller 32. The end travel limit 42 describes a position of the electric actuator 30, disposed between the inboard position 36 and the outboard position 34 of the crop engaging component 22, through which the electric actuator 30 may move without exceeding the physical constraints of the crop engaging component 22, i.e., without moving beyond the outboard position 34. Outboard movement of the electric actuator 30 is stopped at the end travel limit 42, thereby preventing the electric actuator 30 from moving to its full end travel position 40 and damaging the electric actuator 30 and/or the crop engaging component 22.

Figure 2:
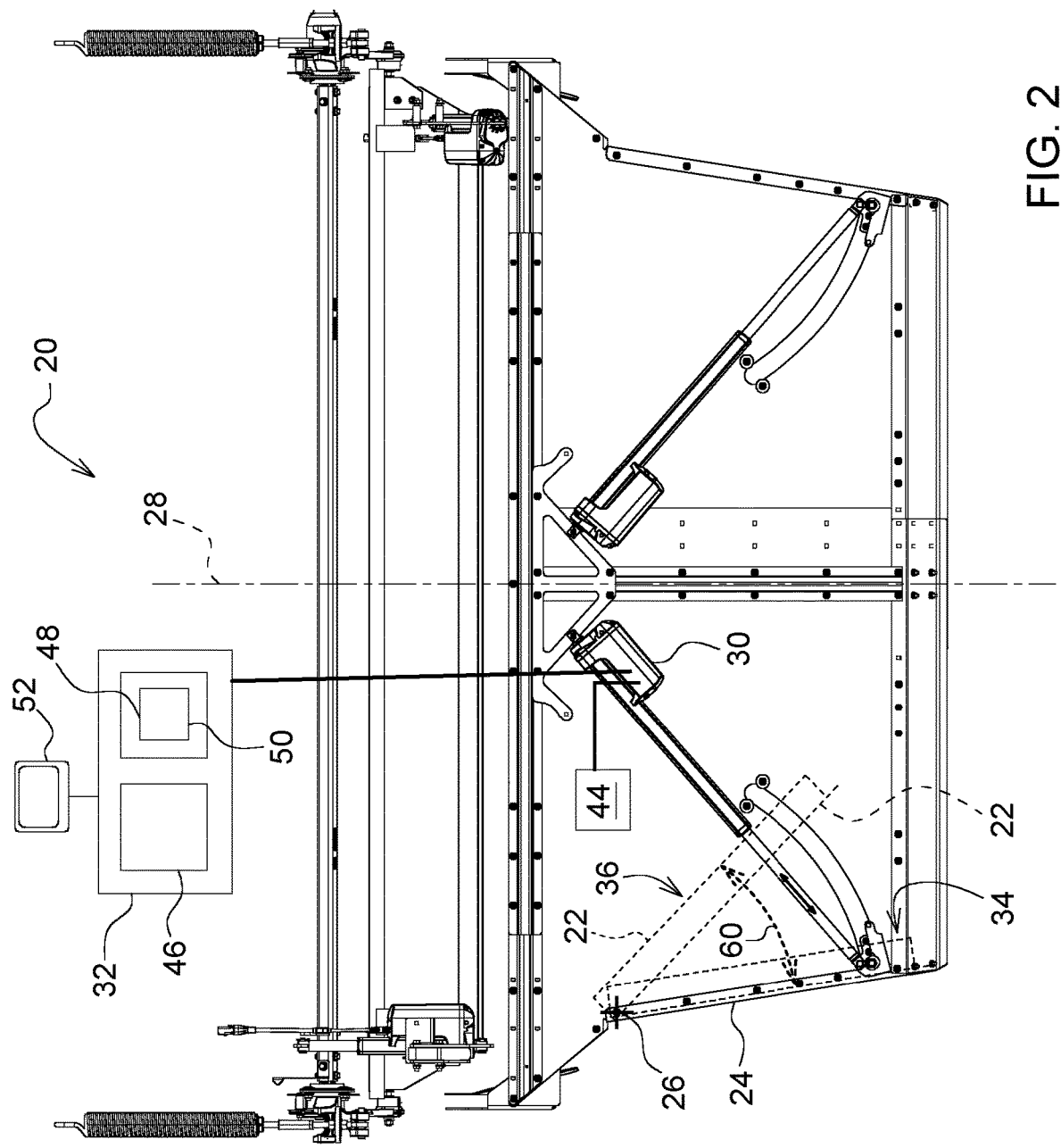
FIG. 2 is a schematic plan view of the crop harvesting implement.

Referring to FIGS. 1 and 2, a current sensor 44 is coupled to the electric actuator 30. The current sensor 44 is operable to sense data related to an electric current of the electric actuator 30. The current sensor 44 may be incorporated into the electric actuator 30, attached to the crop harvesting implement 20 and in communication with the electric actuator 30, or may be remote from the crop harvesting implement 20, such as located on an agricultural vehicle such as but not limited to a tractor, and disposed in communication with the electric actuator 30. The current sensor 44 may directly sense the electric current drawn by or currently being used by the electric actuator 30, or may sense some other data related to the electric current used by the electric actuator 30, which may in turn be used to calculate the electric current used by the electric actuator 30. The data related to the electric current may include, but is not limited to, a temperature, an electrical resistance, a magnetic field, a force, etc. The specific type, construction, operation, etc. of the current sensor 44 are not pertinent to the teachings of this disclosure, are well known to those skilled in the art, and are therefore not described in greater detail herein.

Referring to FIGS. 1 and 2, the controller 32 is disposed in communication with the electric actuator 30 and the current sensor 44. The controller 32 may be operable to receive the data from the current sensor 44 and/or control movement of the electric actuator 30. While the controller 32 is generally described herein as a singular device, it should be appreciated that the controller 32 may include multiple devices linked together to share and/or communicate information therebetween. Furthermore, it should be appreciated that the controller 32 may be located on the crop harvesting implement 20 or located remotely from the crop harvesting implement 20, such as on an associated agricultural vehicle, including but not limited to an agricultural tractor or other similar vehicle.

The controller 32 may alternatively be referred to as a computing device, a computer, a control unit, a control module, a module, etc. The controller 32 includes a processor 46, a memory 48, and all software, hardware, algorithms, connections, sensors, etc., necessary to manage and control the operation of the electric actuator 30. As such, a method may be embodied as a program or algorithm operable on the controller 32. It should be appreciated that the controller 32 may include any device capable of analyzing data from various sensors, comparing data, making decisions, and executing the required tasks.

As used herein, "controller 32" is intended to be used consistent with how the term is used by a person of skill in the art, and refers to a computing component with processing, memory 48, and communication capabilities, which is utilized to execute instructions (i.e., stored on the memory 48 or received via the communication capabilities) to control or communicate with one or more other components. In certain embodiments, the controller 32 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 32 may be in communication with other components on the crop harvesting implement 20, such as hydraulic components, electrical components, sensors, and operator inputs within an operator station of an associated work vehicle. The controller 32 may be electrically connected to these other components by a wiring harness such that messages, commands, and electrical power may be transmitted between the controller 32 and the other components. Although the controller 32 is referenced in the singular, in alternative embodiments the configuration and functionality described herein can be split across multiple devices using techniques known to a person of ordinary skill in the art.

The controller 32 may be embodied as one or multiple digital computers or host machines each having one or more processor 46s, read only memory 48 (ROM), random access memory 48 (RAM), electrically-programmable read only memory 48 (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 48 may include any non-transitory/tangible medium which participates in providing data or computer-readable instructions. The memory 48 may be non-volatile or volatile. Non-volatile media may include, for example, optical or magnetic disks and other persistent memory 48. Example volatile media may include dynamic random access memory 48 (DRAM), which may constitute a main memory 48. Other examples of embodiments for memory 48 include a floppy, flexible disk, or hard disk, magnetic tape or other magnetic medium, a CD-ROM, DVD, and/or any other optical medium, as well as other possible memory 48 devices such as flash memory 48.

The controller 32 includes the tangible, non-transitory memory 48 on which are recorded computer-executable instructions, including an end travel limit calibration algorithm 50. The processor 46 of the controller 32 is configured for executing the end travel limit calibration algorithm 50. The end travel limit calibration algorithm 50 implements a method of defining and setting the end travel limit 42 of the electric actuator 30 to prevent over-travel of the electric actuator 30 relative to the housing 24, thereby preventing damage to the electric actuator 30 and/or the housing 24 of the crop harvesting implement 20.

Figure 4:
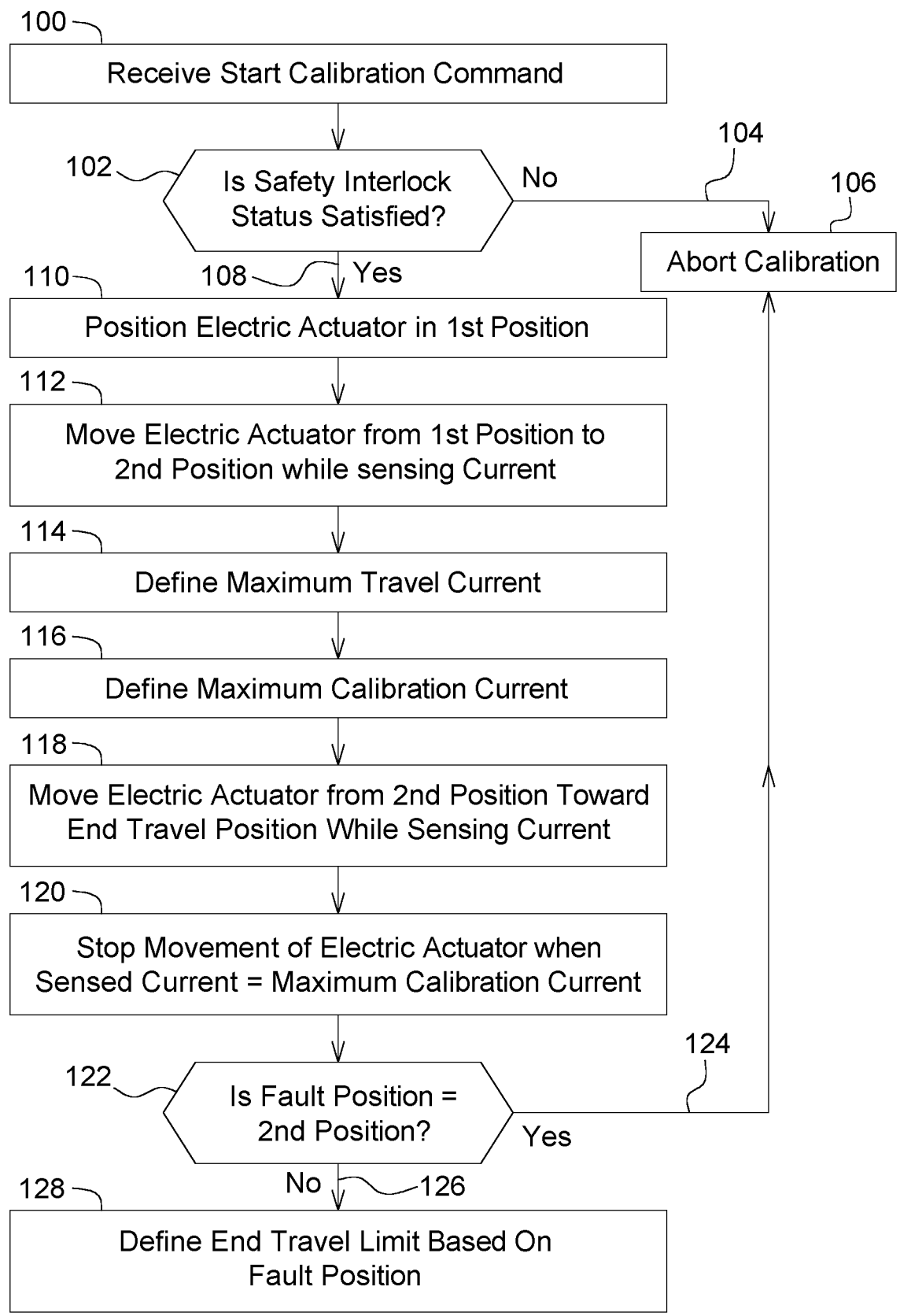
FIG. 4 is a flowchart representing a method of defining an end travel limit for the electric actuator.

Referring to FIGS. 3 and 4, the method executed by the end travel limit calibration algorithm 50 includes receiving a start calibration command with a user input 52 in communication with the controller 32. The step of receiving the start calibration command is generally indicated by box 100 shown in FIG. 4. The user input 52 may include, but is not limited to, a touchscreen display, a button, a switch, a keyboard, etc. An operator may enter the start calibration command into the user input 52 to start or initiate the end travel limit calibration algorithm 50. In other implementations, the end travel limit calibration algorithm 50 may be automatically started or initiated in response to some other event, such as but not limited to a pre-defined maintenance operation.

In response to receiving the start calibration command and prior to moving the electric actuator 30, the controller 32 may determine if a safety interlock status is satisfied, or if the safety interlock status is not satisfied. The step of determining if the safety interlock status is satisfied or not satisfied is generally indicated by box 102 shown in FIG. 4. The safety interlock may include one or more different features, conditions, systems, etc., which must be properly positioned, configured, or engaged, in order to proceed with the calibration of the electric actuator 30. For example, the safety interlock may include, but is not limited to, a position or condition of a driveline of an associated work vehicle, an operating condition or position of moving components of the crop harvesting implement 20, such as but not limited to a cutter bar or crop conditioning elements, a position or orientation of the crop harvesting implement 20, etc. If the controller 32 determines that the safety interlock status is not satisfied, generally indicated at 104 then the controller 32 may abort the calibration process and terminate execution of the end travel limit calibration algorithm 50. The step of aborting the calibration process is generally indicated by box 106 shown in FIG. 4. If the controller 32 determines that the safety interlock status is satisfied, generally indicated at 108 in FIG. 4, then the controller 32 may proceed with the end travel limit calibration algorithm 50.

Once the controller 32 that the safety interlock statis is satisfied, generally indicate at 108 in FIG. 4, the controller 32 then proceeds to position the electric actuator 30 in a first position 54. The step of positioning the electric actuator 30 in the first position 54 is generally indicated by box 110 shown in FIG. 4. The controller 32 then moves the electric actuator 30 from the first position 54 to a second position 56. The step of moving the electric actuator 30 from the first position 54 to the second position 56 is generally indicated by box 112 shown in FIG. 4. As such, the controller 32 moves the electric actuator 30 to the first position 54 prior to moving the electric actuator 30 from the first position 54 to the second position 56. The first position 54 is nearer the begin travel position 38 of the electric actuator 30 than the second position 56. The second position 56 is nearer the end travel position 40 of the electric actuator 30 than the first position 54. Additionally, it should be appreciated that both the first position 54 and the second position 56 are within the range of motion 60 of the crop engaging component 22, and also within the range of travel 62 of the electric actuator 30.

While moving the electric actuator 30 from the first position 54 to the second position 56, the controller 32 senses the data related to the electric current of the electric actuator 30 with the current sensor 44. As noted above, the data related to the electric current may include directly sensing the electric current, or sensing data that is related to the electric current which may be used by the controller 32 to determine and/or calculate the actual electric current. The data related to the electric current of the actuator is sensed throughout the movement of the electric actuator 30 from the first position 54 to the second position 56. The data related to the electric current may be sensed continuously throughout the movement of the electric actuator 30 between the first position 54 to the second position 56, or may be sensed at pre-defined time intervals throughout the movement of the electric actuator 30 from the first position 54 to the second position 56.

The electric actuator 30 exhibits a normal operating speed during normal operation of the crop engaging component 22. During the calibration process, the electric actuator 30 may be moved from the first position 54 to the second position 56 at a calibration speed. The calibration speed is defined to be is less than the normal operating speed. The calibration speed may be less than 50% of the normal operating speed. More particularly, the calibration speed may be less than 25% of the normal operating speed. In one implementation, the calibration speed is approximately 20% of the normal operating speed. By moving the electric actuator 30 from the first position 54 to the second position 56 at the calibration speed, which is significantly slower than the normal operating speed, the current sensor 44 may sense the electric current with more accuracy and with more detail.

When the electric actuator 30 has completed the movement from the first position 54 into the second position 56, the controller 32 may define a maximum value of the electric current sensed during movement of the electric actuator 30 between the first position 54 to the second position 56 as a maximum travel current. The step of defining the maximum travel current is generally indicated by box 114 shown in FIG. 4. As such, the maximum travel current is the maximum value of the electric current sensed during movement of the electric actuator 30 from the first position 54 to the second position 56 during the calibration process.

The controller 32 may then define a maximum calibration current by increasing the maximum travel current by a factor. The step of defining the maximum calibration current is generally indicated by box 16 shown in FIG. 4. The factor may be defined as, but is not limited to, a percentage of the maximum travel current, or a pre-defined value. The maximum travel current is increased by the factor to define the maximum travel current. In one example, the maximum calibration current is defined by increasing the maximum travel current by at least 25% of the maximum travel current (i.e., multiplying the maximum travel current by at least a value of 1.25). More particularly, the maximum calibration current may be defined by increasing the maximum travel current by at least 40% of the maximum travel current (i.e., multiplying the maximum travel current by at least a value of 1.40). In other embodiments, a predefined value may be added to the maximum travel current to define the maximum calibration current.

After the controller 32 has defined the maximum calibration current, the controller 32 may then move the electric actuator 30 from the second position 56 toward the end travel position 40 of the electric actuator 30. The step of moving the electric actuator from the second position toward the end gravel position 40 is generally indicated by box 118 shown in FIG. 4. The controller 32 may move the electric actuator 30 from the second position 56 toward the end travel position 40 at the calibration speed described above. Moving the electric actuator 30 at the calibration speed enables more accurate and precise sensing of the electric current as the electric actuator 30 moves from the second position 56 toward the end travel position 40.

The controller 32 senses the data related to the electric current of the electric actuator 30 with the current sensor 44 while moving the electric actuator 30 from the second position 56 toward the end travel position 40. As noted above, the data related to the electric current may include directly sensing the electric current, or sensing data that is related to the electric current which may be used by the controller 32 to determine and/or calculate the actual electric current. The data related to the electric current of the actuator is sensed throughout the movement of the electric actuator 30 from the second position 56 toward the end travel position 40. The data related to the electric current may be sensed continuously throughout the movement of the electric actuator 30 between the second position 56 toward the end travel position 40, or may be sensed at pre-defined time intervals throughout the movement of the electric actuator 30 from the second position 56 toward the end travel position 40.

The controller 32 stops the movement of the electric actuator 30 from the second position 56 toward the end travel position 40, at a fault position 58, when the data related to the electric current sensed during movement of the electric actuator 30 from the second position 56 toward the end travel position 40 indicates the electric current of the electric actuator 30 is equal to the maximum calibration current. The step of stopping movement of the electric actuator 30 at the fault position 58 is generally indicated by box 120 shown in FIG. 4. As such, the fault position 58 is the position of the electric actuator 30 when the electric current of the electric actuator 30 is equal to the maximum calibration current. Notably, the fault position 58 may be located prior to the electric actuator 30 reaching the end travel position 40.

The controller 32 may then determine if the fault position 58 is identical to or equal to the second position 56, or if the fault position 58 is not identical to or equal to the second position 56. The step of determining if the fault position 58 is equal to the second position 56 is generally indicated by box 122 shown in FIG. 4. In other words, the controller 32 may determine if the electric actuator 30 has moved a distance from the second position 56 prior to the electric current of the electric actuator 30 increasing to the maximum calibration current. If the controller 32 determines that the fault position 58 is identical to or equal to the second position 56, generally indicated at 124, then the controller 32 may abort the calibration process. The step of aborting the calibration process is generally indicated by box 106 shown in FIG. 4. If the controller 32 determines that the fault position 58 is not identical to or not equal to the second position 56, generally indicated at 126, then the controller 32 may proceed with the calibration process described below.

Once the controller 32 has stopped movement of the electric actuator 30 in response to the electric current of the electric actuator 30 being equal to the maximum calibration current, thereby determining and/or identifying the fault position 58, i.e., the position of the electric actuator 30 when the electric current of the electric actuator 30 is equal to the maximum calibration current, then the controller 32 may define the end travel limit 42 of the electric actuator 30 as a function of the fault position 58. The step of defining the end travel limit 42 is generally indicated by box 128 shown in FIG. 4.

The controller 32 may define the end travel limit 42 of the electric actuator 30 as a function of the fault position 58 by, for example, defining the end travel limit 42 of the electric actuator 30 to equal a position disposed a pre-defined offset distance 64 nearer the begin travel limit than the fault position 58. The pre-defined offset distance 64 may equal a distance that is dependent upon the specific application. For example, in one implementation, the pre-defined offset distance 64 may be defined to equal approximately 5 millimeters. It should be appreciated that the pre-defined offset distance 64s for other applications may vary. The end travel limit 42 is defined to include a position nearer the begin travel limit than the fault position 58. As such, the fault position 58 is located between the end travel limit 42 and the end travel position 40 of the electric actuator 30.

In another implementation, the controller 32 may define the end travel limit 42 of the electric actuator 30 as a function of the fault position 58 by, for example, defining the fault position 58 based on a distance traveled between the second position 56 and the fault position 58. For example, if the electric actuator 30 travels 100 mm between the second position 56 and the fault position 58, then the controller 32 may define the end travel limit 42 for the electric actuator 30 to equal a position that is measured from the second position 56 and is, for example, 90% of the distance measured between the second position 56 and the fault position 58, e.g., 90 mm.

It should be appreciated that the end travel limit 42 may be defined based on or as a factor of the fault position 58 in any number of ways, and that the manner in which the end travel limit 42 is defined based on the fault position 58 is limited to the example implementations described herein.

Once the end travel limit 42 of the electric actuator 30 is defined, the controller 32 may save the end travel limit 42 in the memory 48 of the controller 32, and apply the end travel limit 42 to the electric actuator 30 during normal operation of the crop engaging component 22. During normal operation of the electric actuator 30, the controller 32 stops movement of the electric actuator 30 at the end travel limit 42 prior to reaching the end travel position 40 of the electric actuator 30. This ensures that the electric actuator 30 is not over-extended and prevents damage to the electric actuator 30 and/or the crop engaging component 22.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of defining an end travel limit of an electric actuator interconnecting a housing and a crop engaging component of a crop harvesting implement, wherein the electric actuator is moveable between a begin travel position and an end travel position, the method comprising:
   moving the electric actuator from a first position to a second position;
   sensing an electric current of the electric actuator while moving the electric actuator from the first position to the second position;
   defining a maximum value of the electric current sensed during movement of the electric actuator between the first position to the second position as a maximum travel current;
   increasing the maximum travel current by a factor to define a maximum calibration current;
   moving the electric actuator from the second position toward the end travel position of the electric actuator;
   sensing the electric current of the electric actuator while moving the electric actuator from the second position toward the end travel position;
   stopping movement of the electric actuator from the second position toward the end travel position at a fault position when the electric current sensed during movement of the electric actuator from the second position toward the end travel position equals the maximum calibration current;
   defining the end travel limit of the electric actuator to equal a position disposed a pre-defined offset distance nearer the begin travel limit than the fault position.

2. The method set forth in claim 1, wherein the electric actuator exhibits a normal operating speed, and wherein moving the electric actuator from the first position to the second position includes moving the electric actuator from the first position to the second position at a calibration speed that is less than the normal operating speed.

3. The method set forth in claim 2, wherein moving the electric actuator from the second position toward the end travel position includes moving the electric actuator from the second position toward the end travel position at the calibration speed.

4. The method set forth in claim 2, wherein the calibration speed is less than 50% of the normal operating speed.

5. The method set forth in claim 4, wherein the calibration speed is less than 25% of the normal operating speed.

6. The method set forth in claim 1, wherein increasing the maximum travel current by the factor to define the maximum calibration current includes increasing the maximum travel current by at least 25% of the maximum travel current to define the maximum calibration current.

7. The method set forth in claim 6, wherein increasing the maximum travel current by the factor to define the maximum calibration current includes increasing the maximum travel current by at least 40% of the maximum travel current to define the maximum calibration current.

8. The method set forth in claim 1, further comprising positioning the electric actuator in the first position prior to moving the electric actuator from the first position to the second position.

9. The method set forth in claim 1, wherein the first position is nearer the begin travel position than the second position, and wherein the second position is nearer the end travel position than the first position.

10. The method set forth in claim 1, wherein the electric actuator is a linear actuator operable to extend and retract along a linear path.

11. The method set forth in claim 1, further comprising receiving a start calibration command with a user input in communication with a controller.

12. The method set forth in claim 11, further comprising determining if a safety interlock status is satisfied in response to receiving the start calibration command and prior to moving the electric actuator from the first position to the second position, and aborting the calibration process when the safety interlock status is not satisfied.

13. The method set forth in claim 1, further comprising determining if the fault position is identical to the second position, or if the fault position is not identical to the second position, and aborting the calibration process when the fault position is identical to the second position.

14. A crop harvesting implement comprising:
a housing;
a crop engaging component rotatably mounted to the housing;
an electric actuator interconnecting the housing and the crop engaging component, wherein the electric actuator is moveable between a begin travel position and an end travel position;
a current sensor coupled to the electric actuator and operable to sense data related to an electric current of the electric actuator;
a controller in communication with the electric actuator and the current sensor, and operable to receive the data from the current sensor and control movement of the electric actuator, wherein the controller includes a processor and a memory having an end travel limit calibration algorithm stored thereon, with the processor is operable to execute the end travel limit calibration algorithm to:
position the electric actuator in a first position;
move the electric actuator from the first position to a second position;
sense the data related to the electric current of the electric actuator while moving the electric actuator from the first position to the second position;
define a maximum value of the electric current sensed during movement of the electric actuator between the first position to the second position as a maximum travel current;
increase the maximum travel current by a factor to define a maximum calibration current;
move the electric actuator from the second position toward the end travel position of the electric actuator;
sense the data related to the electric current of the electric actuator while moving the electric actuator from the second position toward the end travel position;
stop movement of the electric actuator from the second position toward the end travel position at a fault position when the data related to the electric current sensed during movement of the electric actuator from the second position toward the end travel position indicates the electric current of the electric actuator is equal to the maximum calibration current;
define an end travel limit of the electric actuator as a function of the fault position, whereby during normal operation of the electric actuator the controller stops movement of the electric actuator at the end travel limit prior to reaching the end travel position of the electric actuator.

15. The crop harvesting implement set forth in claim 14, wherein the processor is operable to execute the end travel limit calibration algorithm to move the electric actuator between the first position and the second position, and from the second position to the fault position, at a calibration speed that is at least fifty percent of a normal operating speed of the electric actuator.

16. The crop harvesting implement set forth in claim 14, wherein the electric actuator is a linear actuator operable to extend and retract in response to a control signal from the controller.

17. The crop harvesting implement set forth in claim 14, further comprising saving the end travel limit in the memory of the controller.

18. The crop harvesting implement set forth in claim 14, wherein the processor is operable to execute the end travel limit calibration algorithm to define the end travel limit of the electric actuator as a function of the fault position by defining the end travel limit to equal a position disposed a pre-defined offset distance from the fault position in a direction nearer the begin travel limit.

19. The crop harvesting implement set forth in claim 14, wherein the crop engaging component is a forming shield of a mower implement.

* * * * *